(12) United States Patent
Feldman

(10) Patent No.: US 6,501,230 B1
(45) Date of Patent: Dec. 31, 2002

(54) DISPLAY WITH AGING CORRECTION CIRCUIT

(75) Inventor: Rodney D. Feldman, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/940,192

(22) Filed: Aug. 27, 2001

(51) Int. Cl.[7] .............................................. H05B 37/02
(52) U.S. Cl. ....................................... 315/169.3; 345/55
(58) Field of Search .............................. 315/169.2, 158, 315/307, 308, 149, 159, 152, 312, 294, 169.3, 169.1; 345/55

(56) References Cited

U.S. PATENT DOCUMENTS

| | | | | |
|---|---|---|---|---|
| 5,416,516 A | * | 5/1995 | Kameyama et al. | 348/246 |
| 5,937,272 A | | 8/1999 | Tang | 438/30 |
| 6,081,073 A | | 6/2000 | Salam | 315/169.2 |
| 6,359,398 B1 | * | 3/2002 | Nakajima et al. | 315/369 |

FOREIGN PATENT DOCUMENTS

WO   WO 99/41732   8/1999

OTHER PUBLICATIONS

Salam, "OLED and LED Displays with Autonomous Pixel Matching", SID 2001 Digest, pp. 67–69.
U.S. patent application Ser. No. 09/774,221, Feldman et al., filed Jan. 30, 2001.
U.S. patent application Ser. No. 09/707,223, Cok et al., filed Nov. 6, 2000, allowed Jul. 3, 2001.
U.S. patent application Ser. No. 09/577,241, Cok et al., filed May 24, 2000.

* cited by examiner

*Primary Examiner*—Don Wong
*Assistant Examiner*—James Clinger
(74) *Attorney, Agent, or Firm*—Thomas H. Close

(57) ABSTRACT

A display includes an electroluminescent display panel containing a light emitting material; a video interface circuit for producing an analog video signal for driving the display; an age circuit for supplying a signal representing the age of the light emitting material; an aging correction circuit responsive to the age signal for forming an analog aging correction signal, the aging correction circuit including, controller means responsive to the age signal for producing a digital correction value, and a digital to analog converter for converting the digital correction value to an analog correction signal; and a summing amplifier for summing the analog aging correction signal with the video signal.

38 Claims, 12 Drawing Sheets

DISPLAY WITH AGING CORRECTION CIRCUIT

FIELD OF THE INVENTION

This invention relates generally to color flat panel displays and, more particularly, to an electroluminescent flat panel display with aging correction.

BACKGROUND OF THE INVENTION

Electroluminescent displays are flat panel displays that emit light from pixel locations based on the level of signal applied to each pixel location. Organic electroluminescent displays employ organic thin films deposited at pixel locations to emit light. The intensity of the emitted light is proportional to current passing through the organic thin films. The color of the emitted light and the efficiency of the energy conversion from current to light are determined by the composition of the organic thin films.

FIG. 1 shows a cross section view of a typical prior art active matrix bottom emitting electroluminescent display such as an organic light emitting diode (OLED) flat panel display 10 of the type shown in U.S. Pat. No. 5,937,272, issued Aug. 10, 1999 to Tang. The OLED display 10 includes a transparent substrate 12 that provides mechanical support for the display device, a transistor switching matrix layer 14, a light emission layer 18 containing materials forming organic light emitting diodes, and a cable 20 for connecting circuitry within the flat panel display to video interface circuit 24, located on printed circuit board 26. The transparent substrate 12 is typically glass, but other materials, such as plastic, may be used. The transistor switching matrix layer 14 contains a two-dimensional matrix of thin film transistors (TFTs) 16 that are used to select which pixel in the OLED display receives image data at a given time. The thin film transistors 16 are manufactured using conventional semiconductor manufacturing processes, and therefore extra thin film transistors 16 may be used to form circuitry for a variety of uses. As taught in U.S. Ser. No. 09/774,221 filed Jan. 30, 2001, by Feldman et al., the presence of TFTs within an active matrix flat panel display allows functions other than display to be implemented on the same substrate as the display function, producing a system-on-panel. The OLED display is responsive to digital control signals and analog video signals generated by video interface circuit 24.

It is known to those skilled in the art that organic light emitting materials undergo an aging process, where changes in the materials cause the light output of a given material for a constant input current stimulus to change with age. This causes a given image signal to produce a different image as the materials age. However, users of organic electroluminescent displays expect a given image signal to produce the same image, regardless of the ages of the organic light emitting materials. Alternatively, users may expect a given image signal to produce a pleasing image, although not necessarily the same image, regardless of the ages of the organic light emitting materials. For example, a dimmer image, but with proper color balance, may be acceptable, rather than the same, brighter image.

P. Salam, in his paper "OLED and LED Displays with Autonomous Pixel Matching," published in the SID 2001 Digest, pages 67–69, describes a closed-loop luminance control system that utilizes light sensors placed around the periphery of an OLED display for sensing pixel light output to feed back luminance information to a color correction circuit. A "monitoring mode" is used for the pixel light display when the display is not in use wherein a single or area of pixels, is addressed one color channel at a time, and the emitted light is detected to generate a control signal.

The signal from the light sensor undergoes analog-to-digital conversion, and a processor calculates the measured light value and stores it. During normal image display, the display controller utilizes this stored luminance information to correct for non-uniformities in the light outputs from the pixels, which may occur due to aging. This method is complex because it requires a "pixel luminance map" that must store information regarding each pixel, or each area of pixels, which may require a lot of memory. This can be expensive to implement, particularly for portable devices, which are often price sensitive. Additionally, the "pixel luminance map" memories must be updated periodically, and therefore must be either a volatile or a rewritable volatile memory. Volatile memories typically consume more power than non-volatile memories, in order to maintain their contents. Non-volatile memories such as FLASH consume less power when not being written, but have a limited number of update cycles prior to failure. Therefore, a "pixel luminance map" may be costly, power inefficient, and have limited life.

U.S. Pat. No. 6,081,073, issued Jun. 27, 2000 to Salam, describes a circuit and method for minimizing luminance and color variation in a light emitting diode matrix display, where light output is measured and stored, and a microprocessor or controller controls the measurement and correction process. Again, this method of performing luminance and color correction utilizes a memory map storing information about each display pixel, and therefore may be unnecessarily complex.

International application WO99/41732, published Aug. 19, 1999, by Matthies et al. describes several methods for correcting brightness due to OLED materials aging and pixel non-uniformity. These methods include measuring a physical aspect regarding light emitting pixels, performing calculations, and changing the current supplied to these light emitting pixels based on these measurements, in relation to stored accumulated current-values. This method directly modulates OLED current, and must therefore operate at the pixel level. However, display systems typically supply image information to displays using analog voltages and electronics within the display, or within the drivers that directly supply pixel current to pixels, to convert the voltage information into current. It is often desirable to modify these analog voltages, and not the currents to which the input analog voltages are converted.

There is a need therefore for an improved means of modifying analog video signals in a display device for the purpose of compensating for the aging of the corresponding organic light emitting materials that the signals drive, utilizing a simplified circuit.

SUMMARY OF THE INVENTION

The need is met according to the present invention by providing a display, that includes an electroluminescent display panel containing a light emitting material; a video interface circuit for producing an analog video signal for driving the display; an age circuit for supplying a signal representing the age of the light emitting material; an aging correction circuit responsive to the age signal for forming an analog aging correction signal, the aging correction circuit including, controller means responsive to the age signal for producing a digital correction value, and a digital to analog converter for converting the digital correction value to an analog correction signal; and a summing amplifier for summing the analog aging correction signal with the video signal.

Advantages

The display according to the present invention is advantageous in that it exhibits a near constant luminance and/or color balance for given analog video voltages as the light emitting materials of an electroluminescent display age. The circuit is optimized for compensating analog video channels, and therefore is simpler, more cost efficient, and benefits from higher manufacturing yields than previous methods.

DETAILED DESCRIPTION OF THE INVENTION

Figure 1:
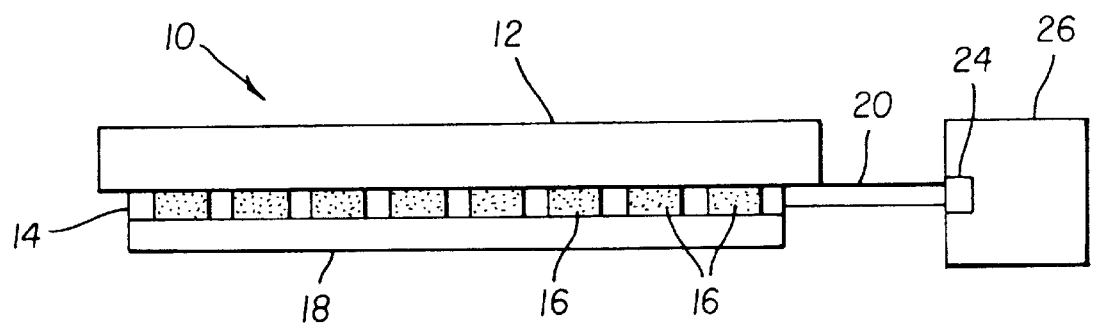
FIG. 1 is a schematic diagram showing the structure of a prior art organic electroluminescent display.
Figure 2:
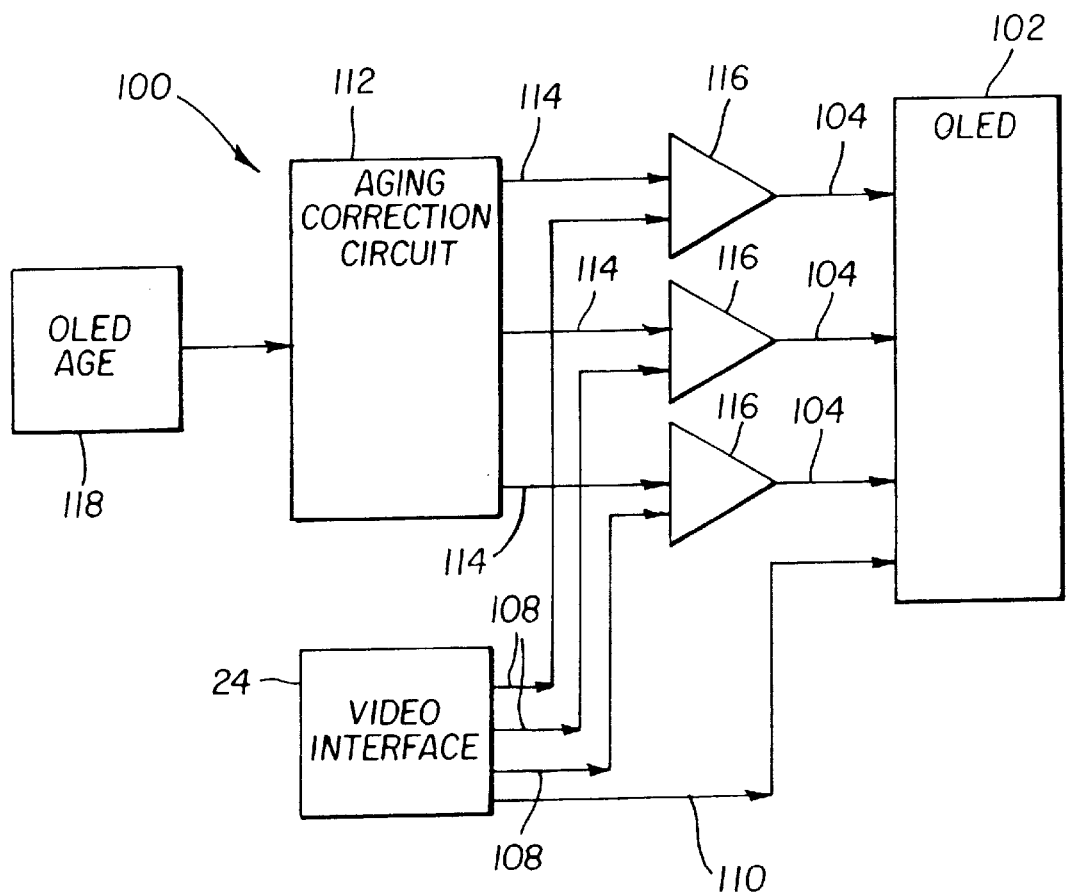
FIG. 2 is a schematic diagram showing an aging correction circuit for an organic electroluminescent display according to the present invention, where analog aging correction signals are combined with analog video signals.

Referring to FIG. 2, an electroluminescent display system generally designated 100 according to the present invention includes an electroluminescent display panel 102 driven by one or more aging corrected analog video signals 104. A video interface circuit 24 produces analog video signals 108 and control signals 110. An aging correction circuit 112 is responsive to an electroluminescent display age input from an age circuit 118, to produce analog correction signals 114. The analog correction signals are combined with the analog video signals 108 within summing amplifiers 116. The electroluminescent display panel 102 contains light emitting materials. For multicolor displays, the light emitting materials that emit the different colors of light may age at different rates.

Typically, an age for each color of light emitting materials is provided, since the light emitting materials for different colors age at different rates. However, a single overall age signal may be presented to a multiplicity of video channels when the light emitting materials of these video channels age similarly.

The age circuit 118 may supply one average age of the light emitting materials, an average age of each light emitting material in a multicolor electroluminescent display, an average age of the light emitting material for subset areas of the active area, an average age of each light emitting material for subset areas of the active area, an average age of the light emitting materials for each pixel within the active area, or the age of each light emitting material at each pixel of the active area. The granularity of age measurement depends on a tradeoff between design complexity, cost, the profiles of the aging of the light emitting materials, and power consumption.

Various means of measuring the age of the OLED may be used. For example, age may be measured by counting the time the OLED has been driven. Alternatively, age may be indirectly measured by using a light detector to measure the actual light output of the electroluminescent display, and comparing it to the expected light output for the given drive conditions, as described in U.S. Pat. No. 6,081,073, referenced above. This light output may be taken from the display of normal images, or from test patterns displayed during inactive periods, as described by Salam, in his paper "OLED and LED Displays with Autonomous Pixel Matching," referenced above. Age may also be indirectly measured by using a reference pixel. In one method, the light output of a reference pixel formed within the electroluminescent display panel 102 emits light, and the light output is sensed, as described in copending U.S. patent application Ser. No. 09/707,223, filed Nov. 6, 2000 by Cok et al., and allowed Jul. 3, 2001.

In a second method, the electrical characteristics of a reference pixel are measured. The measured electrical characteristic must change proportionally to the OLED material's age. This method is described in copending U.S. patent application Ser. No. 09/577,241, filed May 24, 2000 by Cok et al. When indirect measurements are used for measuring the age of light emitting materials, the age circuit 118 may produce a measured value that is related to age, rather than an actual chronological age. The aging correction circuit 112 then converts this measured value into a chronological actual age via a functional relationship.

Figure 3:
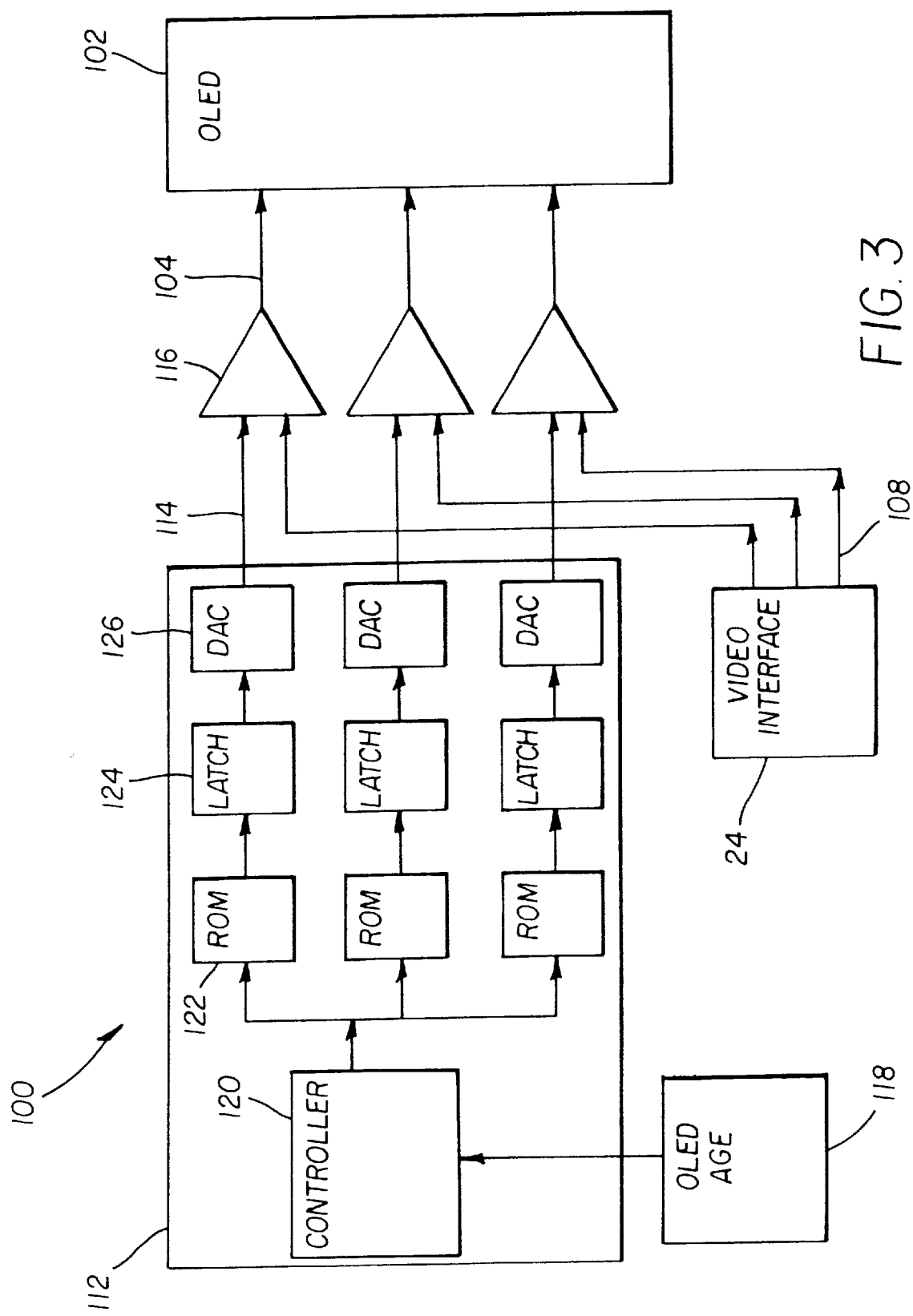
FIG. 3 is a schematic diagram showing one embodiment of the aging correction circuit containing a controller, and one memory, one latch, and one digital-to-analog converter per analog video channel.

A number of implementations exist for the aging correction circuit 112. One embodiment is shown in FIG. 3. Here, the aging correction circuit 112 contains a controller 120, one or more memories 122, one or more latches 124, and one or more digital-to-analog converters 126. The controller 120 may be implemented as custom digital logic, a programmed microprocessor, a microcontroller, or digital signal processor, and is responsive to age input from age circuit 118. The memories 122 hold age correction information, where each memory address corresponds to a predetermined age, and the contents of each memory location contain a digital voltage difference based on the predetermined age. Thus, the memories 122 are used as correction value look-up tables. Because these memories 122 do not contain a "pixel luminance map," the size of the memories used in the current embodiment are typically much smaller than those used to store a pixel luminance map. The memories may be volatile or non-volatile. Volatile memories are useful for use with different electroluminescent display panels 102 having different aging characteristics, which occurs relatively often. However, volatile memories require initialization prior to use in aging correction. Alternatively, non-volatile memories are useful when the aging correction circuit 112 is normally operated with a single electroluminescent display, and therefore does not need initialization prior to every use.

Non-volatile memories may be read-only memory (ROM), electrically programmable read-only memory (EPROM), electrically erasable programmable read-only memory (EEPROM), or FLASH memory. The latter two types of memory are reprogrammable, and therefore allow for updates to the lookup table for better accuracy in the future, or for re-use of the circuitry with different devices or organic light emitting materials. However, the frequency of update is relatively low compared to the frequency of update of a "pixel luminance map," and therefore the number of write cycles for a FLASH device will usually not be a concern.

Latches 124 are used to synchronize the digital aging correction value to the clock controlling the digital-to-analog converters 126. The latches 124 may be omitted if this synchronization occurs inherently as a part of circuit operation, or if the memories 122 contain a latching function.

Utilizing the input age, the controller 120 produces a corresponding memory address for the memories 122. The address is sent to the memories 122, and corresponding digital aging correction values are read from these memories 122. When present, latches 124 then latch these digital aging correction values. The digital-to-analog converters 126 then convert these digital aging correction values to analog form.

Figure 4:
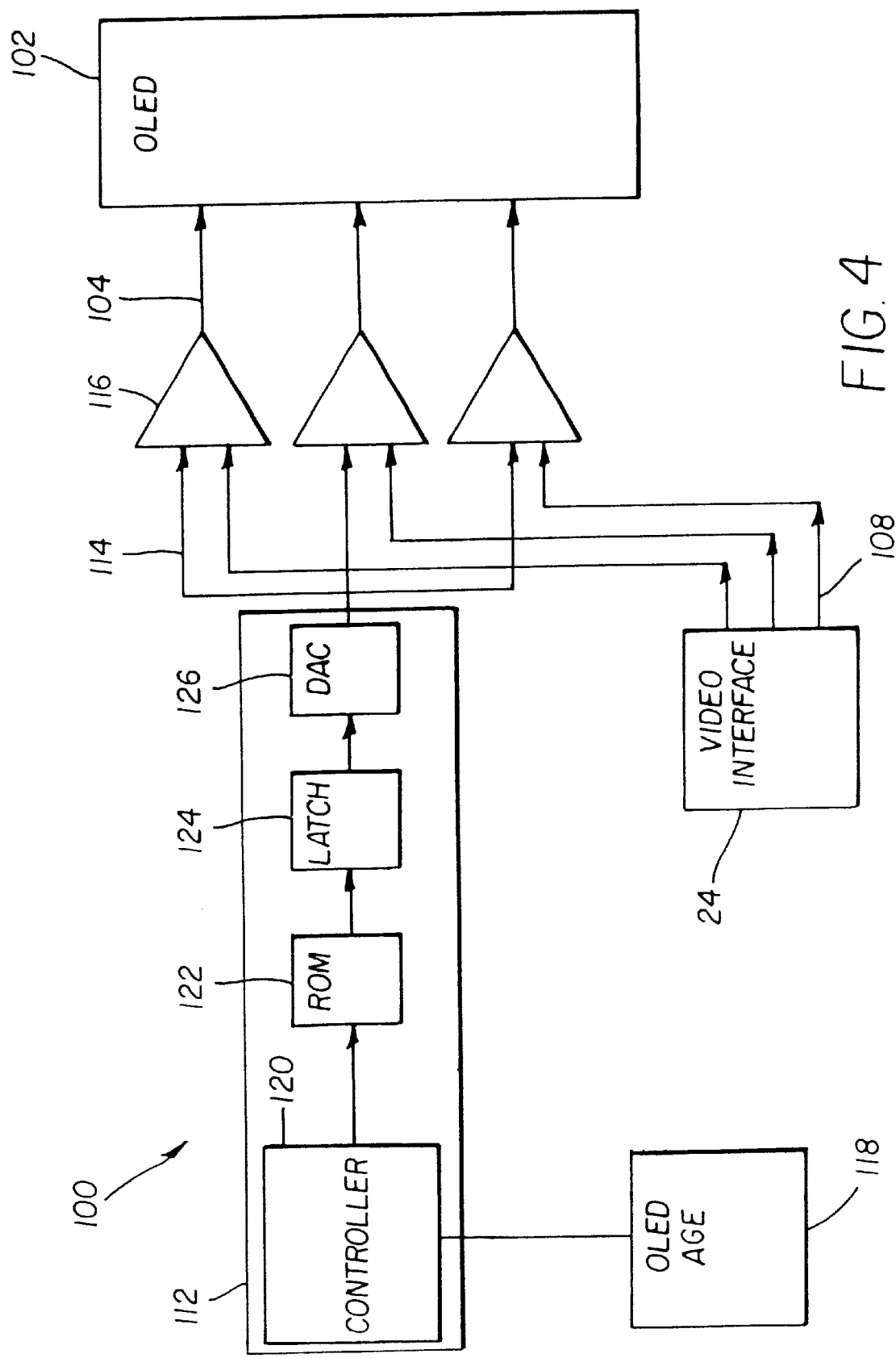
FIG. 4 is a schematic diagram showing an alternative embodiment of the aging correction circuit containing a controller, one memory, one latch, and one digital-to-analog converter controlling all analog video channels.

FIG. 4 shows an embodiment of the present invention where the aging correction circuit 112 contains only one memory 122, one latch 124, and one digital-to-analog converter 126. The output of the aging correction circuit 112 is combined with more than one video channel using summing amplifiers 116. This embodiment is useful where two different light emitting materials exhibit the same, or relatively close, aging profiles, or where reduced complexity of the aging correction circuit 112 is desired. This embodiment has the advantages of being simple, thereby reducing cost, using fewer materials, and improving circuit yields.

Figure 5:
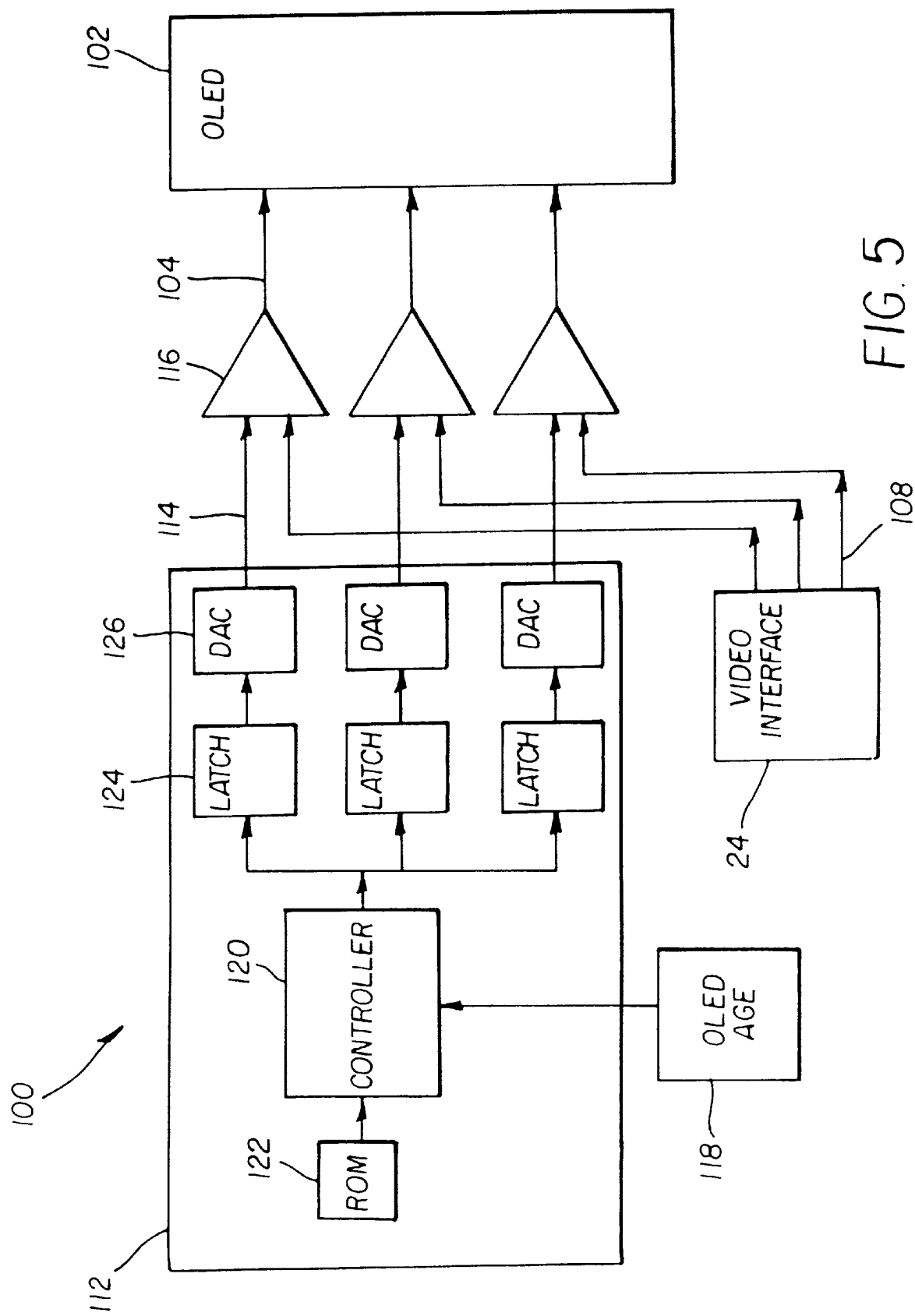
FIG. 5 is a schematic diagram showing a further alternative embodiment of the aging correction circuit containing a controller connected to one memory, and one latch and digital-to-analog converter per analog video channel.

FIG. 5 shows an embodiment of the present invention where the aging correction circuit 112 contains a single memory 122, a controller 120, one or more latches 124, and one or more digital-to-analog converters 126. Controller 120 is responsive to organic electroluminescent display age input 118 and reads appropriate aging-to-voltage correction data from memory 122. When multiple color channels are present, the controller 120 computes the appropriate aging-to-voltage correction value for one color channel at a time, and stores this value in the appropriate latch 124. Once a new value is stored in latch 124, the corresponding digital-to-analog converter 126 converts this digital value to analog.

Controller 120 synchronizes the look-up operation, latching, and the digital-to-analog conversion. Because the light emitting materials aging process is relatively slow (measured in hours) as compared to the look-up, computation, latching, and digital-to-analog conversion process using conventional clock periods (measured in hundreds of microseconds), this embodiment may be utilized to reduce the parts count in the circuit. Therefore, this embodiment reduces materials and cost, and improves yields over more complex embodiments.

Figure 6:
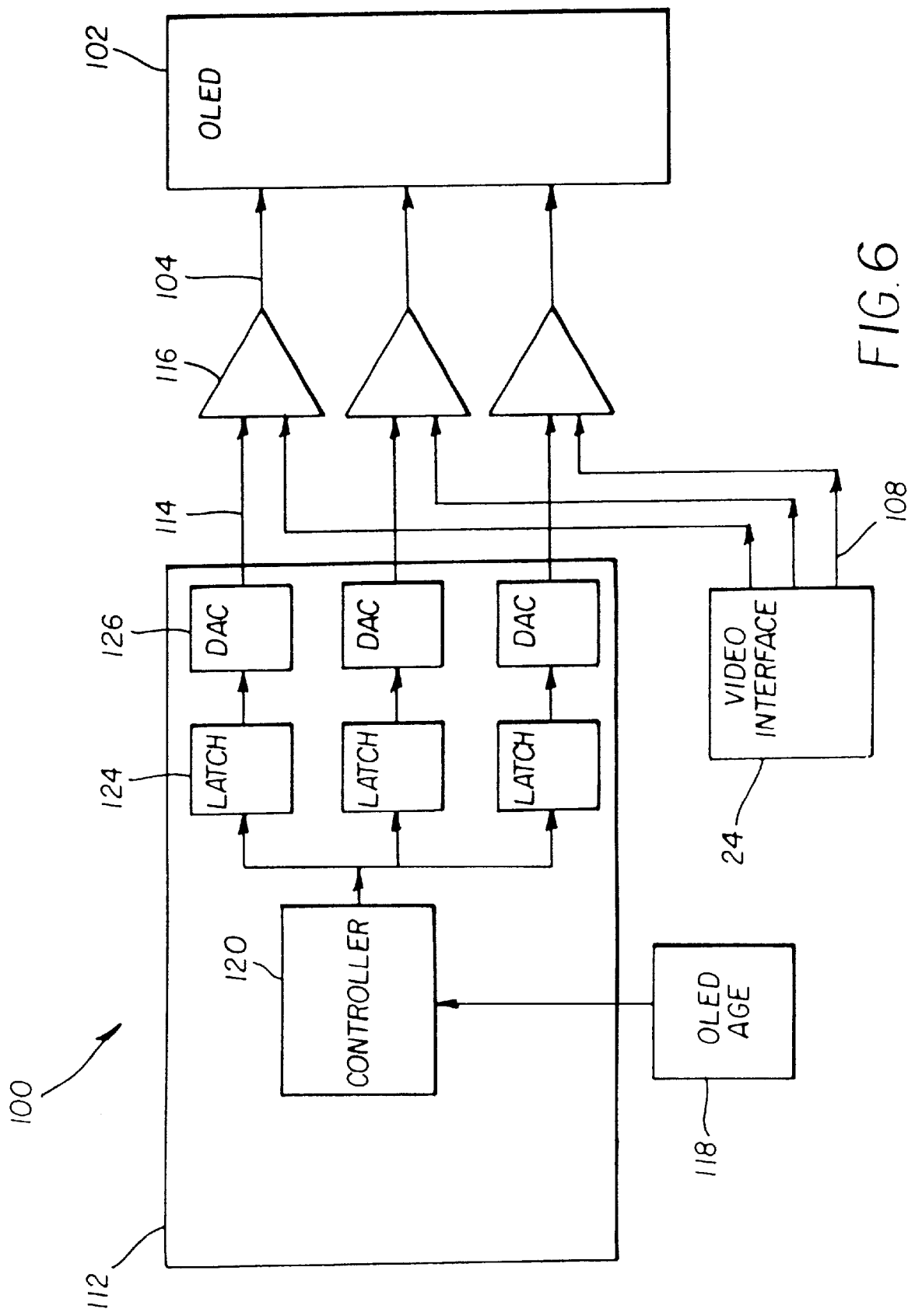
FIG. 6 is a schematic diagram showing one implementation of the aging correction circuit containing a controller connected to one latch and digital-to-analog converter per analog video channel.

FIG. 6 shows an embodiment of the present invention where the aging correction circuit 112 contains controller 120, one or more latches 124, and one or more digital-to-analog converters 126. This embodiment does not use a memory look-up table, but instead relies on a mathematical relationship to directly calculate an aging-to-voltage correction value via computations performed by controller 120. Different mathematical relationships may be used for different light emitting materials within the organic electroluminescent display 102. The digital age-to-voltage correction values are stored in latches 124, and converted to analog voltages by digital-to-analog converters 126. This embodiment is useful where the mathematical relationship between the age of the light emitting materials and light output is relatively simple and therefore does not require a very powerful controller for computation. Likewise, this embodiment is useful when the aging process of the materials is slow enough so that complex calculations may be performed over a relatively long period of time. This embodiment has the advantage of eliminating the memories associated with lookup tables, and therefore requires fewer materials, reduces cost, improves yields, and reduces manufacturing steps, since manufacturing processes associated with memories are often different from those associated with digital logic.

Figure 7:
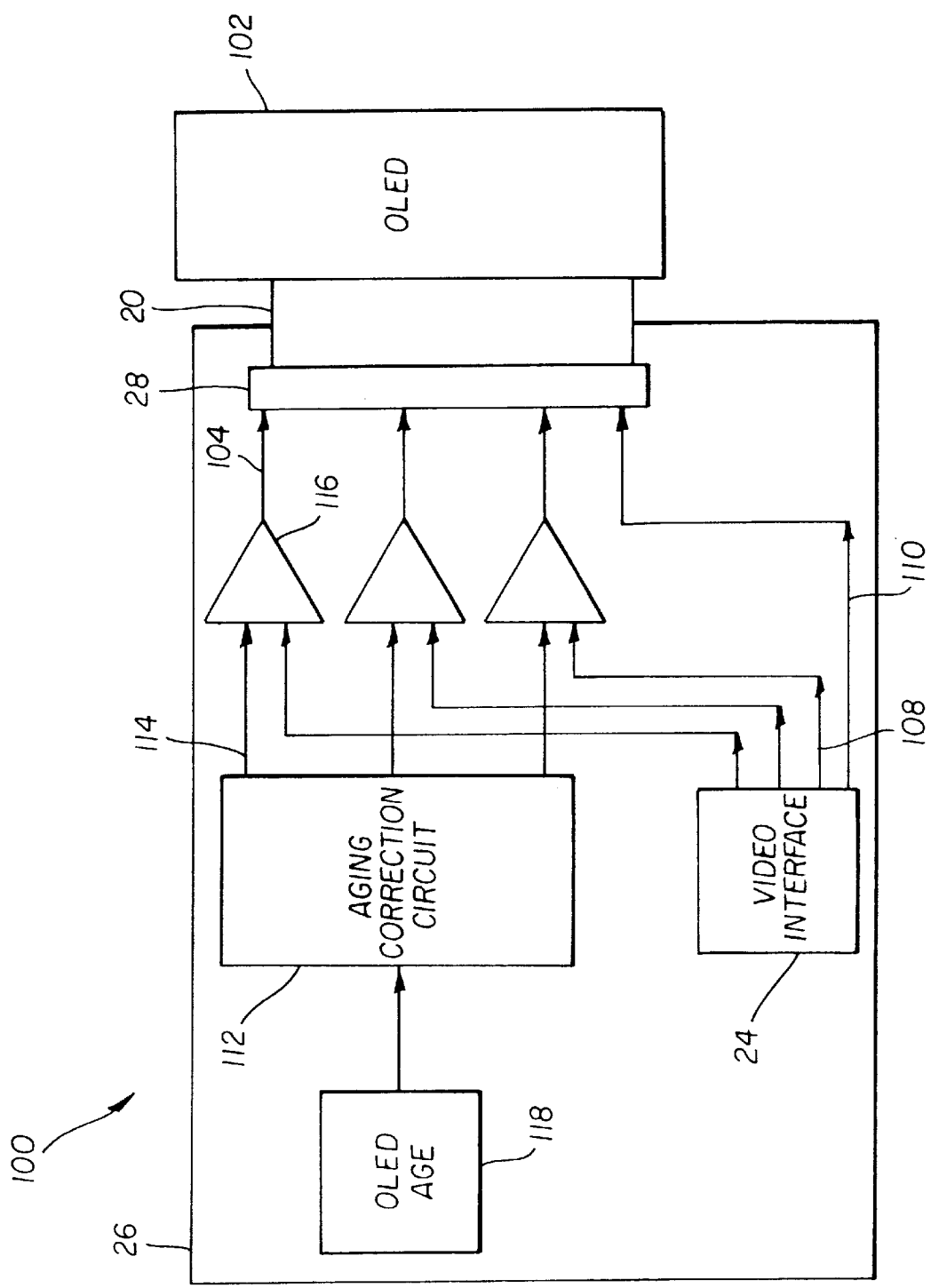
FIG. 7 is a schematic diagram showing a conventional implementation of the aging correction circuit where all components of the aging correction circuit are implemented on a printed circuit board.

FIG. 7 shows the conventional placement of the various elements of the electroluminescent display system 100. Conventionally, OLED age circuit 118, the aging correction circuit 112, the video interface circuit 24, and the summing amplifiers 116 would be components mounted on a circuit board 30. The aging corrected analog video signals 104 are then supplied to the organic electroluminescent display panel 102 via a cable 20. The cable 20 connects to the printed circuit board 26 at connector 28.

Figure 8:
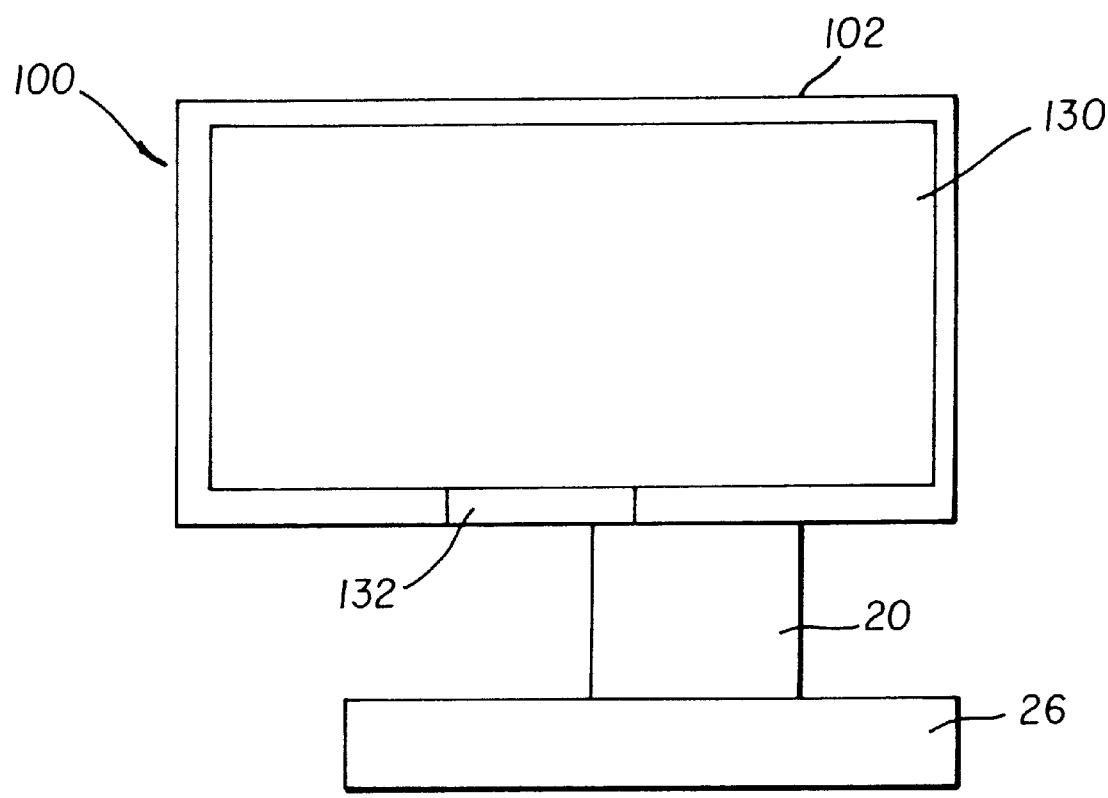
FIG. 8 is a diagram of an organic electroluminescent display showing its active area and an area where additional circuitry may be implemented.

As disclosed in U.S. Ser. No. 09/774,221, referenced above, circuitry may be integrated on the same substrate as an active matrix electroluminescent display. Therefore, all, or a part of the circuitry described herein with respect to aging correction may be implemented on the electroluminescent display's substrate. FIG. 8 shows the basic structure of such an electroluminescent display system 100. Electroluminescent display panel 102 includes an active area 130 in which the light emitting materials and pixels of the electroluminescent display panel 102 are located. Additionally, since thin film transistors are located within the active area 130, it is relatively simple to form additional circuitry 132 including additional thin film transistors around the periphery of the active area 130. For example, this circuitry 132 may be placed close to cable 20, if it is responsive to signals carried over the cable 20, and the output of the circuitry 132 is used to control circuitry within the active area 130. Alternatively, existing circuitry within active area 130 may be modified to include all of, or portion of, additional circuitry 132.

Figure 9:
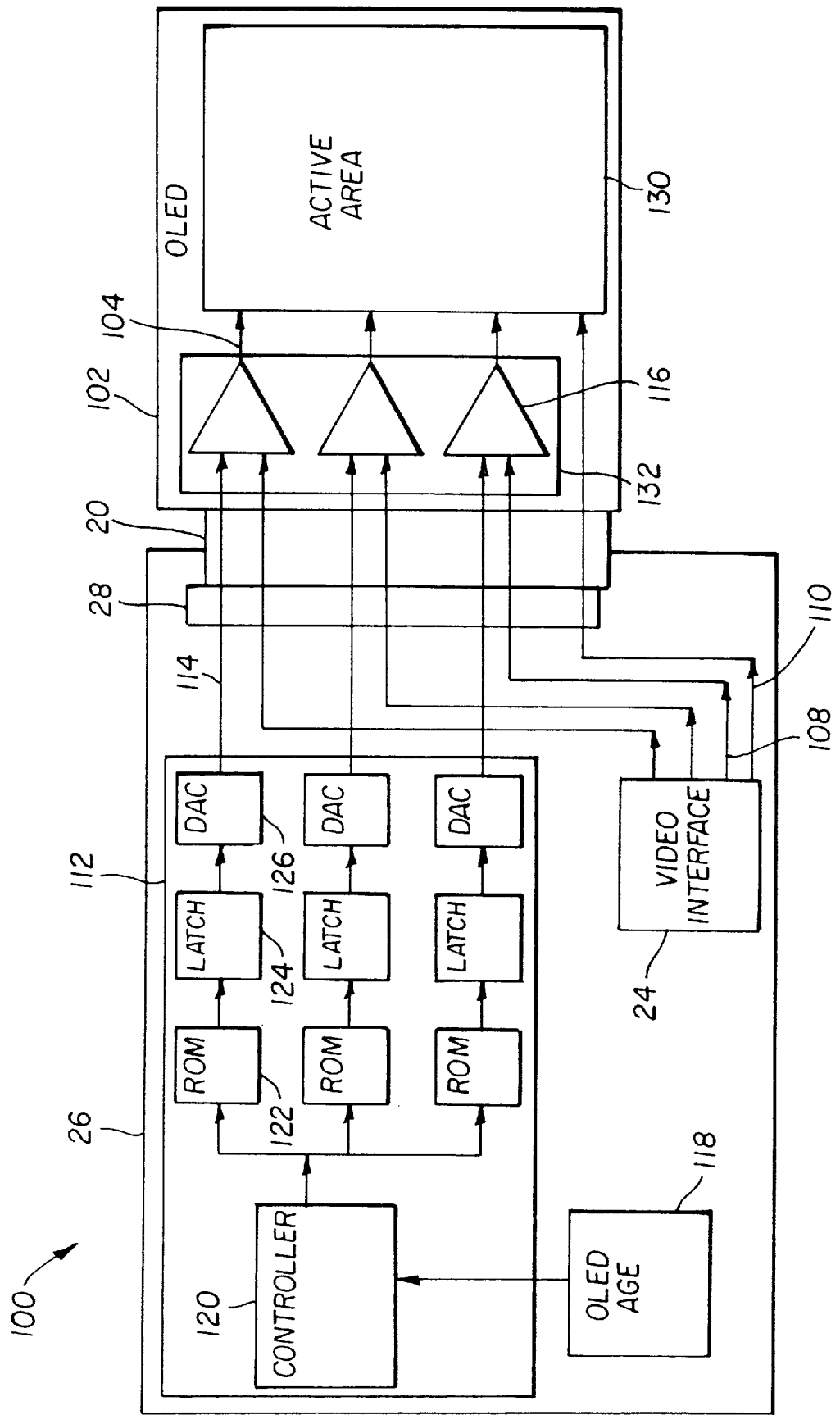
FIG. 9 is a schematic diagram showing an implementation of the present invention where amplifiers are implemented within the organic electroluminescent display, and all other components are implemented on a printed circuit board.

FIG. 9 shows an embodiment of the present invention where the summing amplifiers 116 are physically located on the electroluminescent display panel 102 within circuitry 132. Preferably, the summing amplifiers 116 are placed around the periphery of the active area 130. One or more analog correction signals 114, along with analog video signals 108, are transmitted over cable 20 to the electroluminescent display 102. The summing amplifiers 116 easily integrate into the manufacturing process of the electroluminescent display panel 102, since such analog circuitry is already formed within the electroluminescent display itself to accommodate the analog video channels. This embodiment has the advantage of reducing parts count on the printed circuit board 26, utilizing high density integration technology on the electroluminescent display panel 102, reducing overall system cost.

Figure 10:
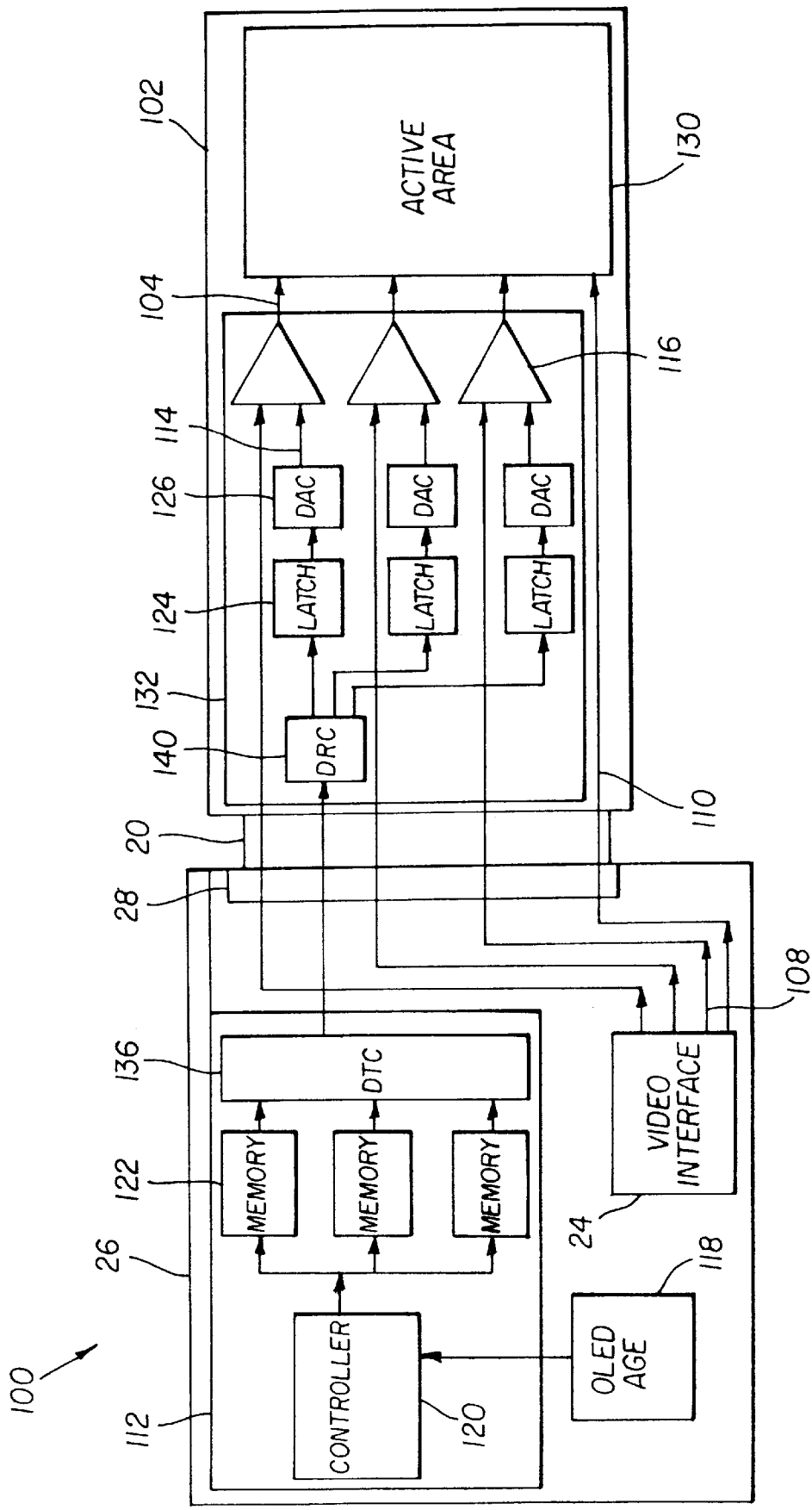
FIG. 10 is a schematic diagram showing an implementation of the present invention where latches, digital-to-analog converters, and amplifiers are implemented within the organic electroluminescent display, and all other components are implemented on a printed circuit board.

FIG. 10 shows a further embodiment of the present invention where the latches 124, the digital-to-analog converters 126 and the summing amplifiers 116 are physically located on the electroluminescent display 102 within circuitry 132. Typically, the latches 124, the digital-to-analog converters 126, and the summing amplifiers 116 are placed around the periphery of the active area 130. The digital aging-to-color voltage correction output by the memories 122 on the printed circuit board 26, along with analog video signals 108, are transmitted over cable 20 to the electroluminescent display panel 102. A digital transmission circuit 136 performs a conversion of the digital aging-to-color voltage correction value to the transmission format. A digital receiver circuit 140, located within circuitry added to the electroluminescent display panel 102, receives these transmitted correction values, and stores them in the appropriate latch 124 on the electroluminescent display panel 102. The digital aging-to-color voltage correction values are transmitted digitally over cable 20. This digital transmission can utilize serial or parallel transmission format. Serial transmission is preferred, since fewer conductors are required, minimizing materials and therefore cost. Serial transmission is often slower than parallel transmission. However, since the aging rate of the light emitting materials is very slow in comparison to conventional serial transmission rates, it is normally acceptable to transmit at this lower rate. This embodiment has the advantage of reducing parts count on the printed circuit board 26, utilizing high density integration technology on the electroluminescent display panel 102, reducing overall system cost.

Figure 11:
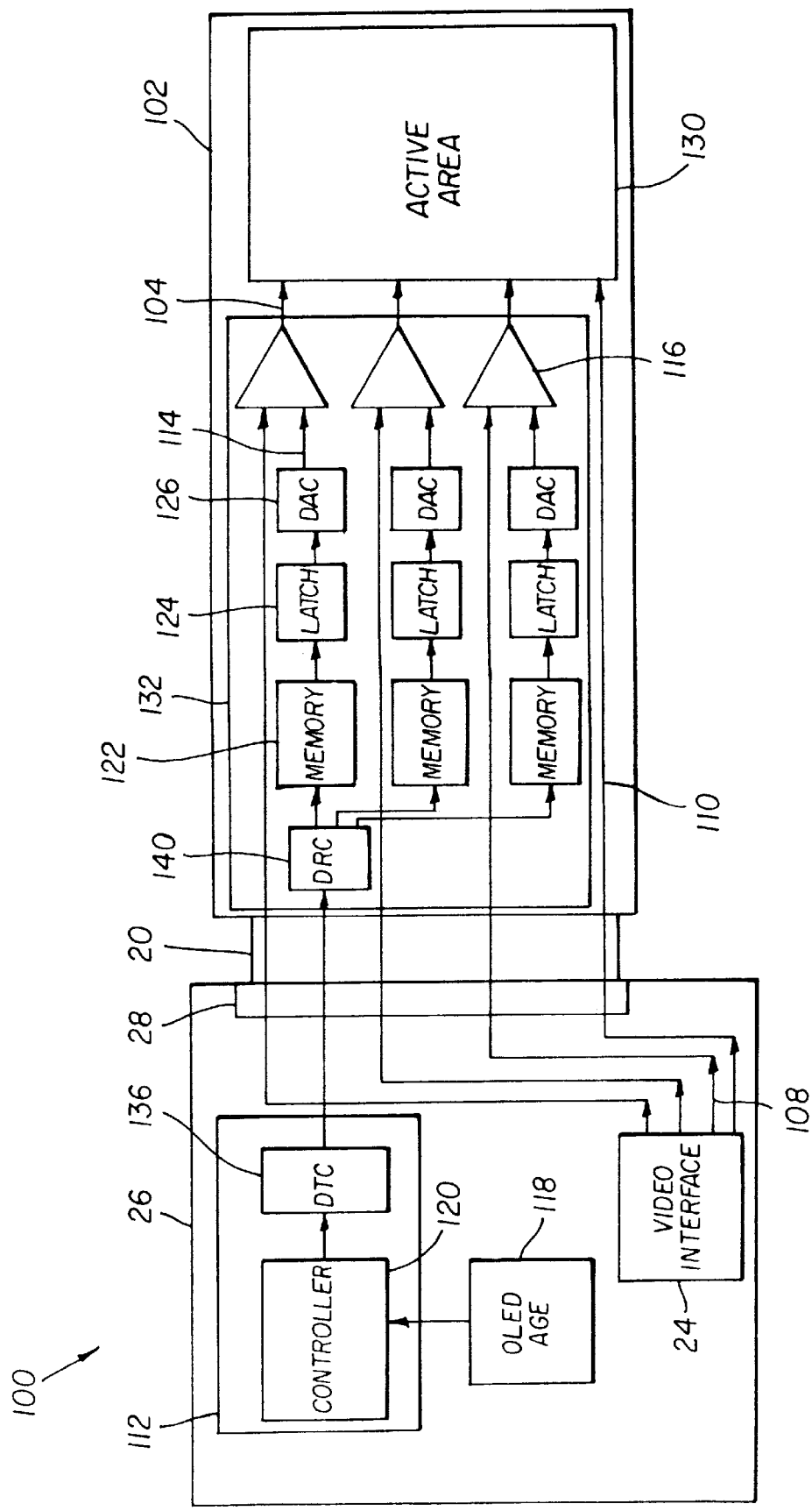
FIG. 11 is a schematic diagram showing an implementation of the present invention where memories, latches, digital-to-analog converters, and amplifiers are implemented within the organic electroluminescent display, and all other components are implemented on a printed circuit board.

FIG. 11 shows a further embodiment of the present invention where the memories 122, latches 124, the digital-to-analog converters 126 and the summing amplifiers 116 are physically located on the electroluminescent display panel 102 within circuitry 132. Typically, the memories 122, the latches 124, the digital-to-analog converters 126 and the summing amplifiers 116 are placed around the periphery of the active area 130. Controller 120 on the printed circuit board 26 computes the digital memory address values. These digital memory address values, along with analog video signals 108, are transmitted over cable 20 to the electroluminescent display panel 102. A digital transmission circuit 136 performs a conversion of the digital memory address values to the transmission format. A digital receiver circuit 140, located within circuitry added to the electroluminescent display panel 102, receives these transmitted correction values, and routes them to the appropriate memories 122 on the electroluminescent display panel 102. This embodiment has the advantage of further reducing parts count on the printed circuit board 26, utilizing high density integration technology on the electroluminescent display panel 102, reducing overall system cost.

Figure 12:
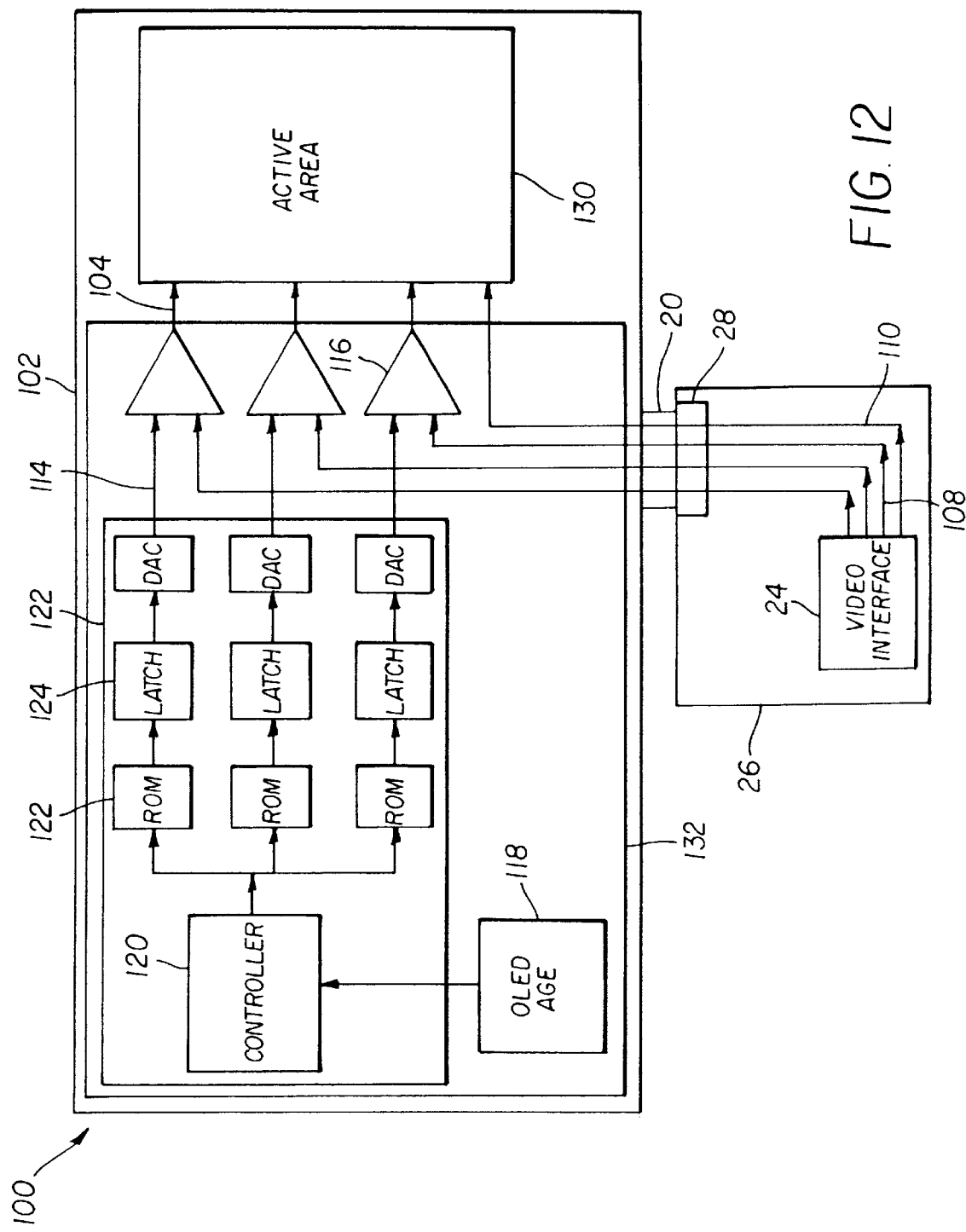
FIG. 12 is a schematic diagram showing an implementation of the present invention where a controller, memories, latches, digital-to-analog converters, and amplifiers are implemented within the organic electroluminescent display, and all other components are implemented on a printed circuit board.

FIG. 12 shows a further embodiment of the present invention where the entire aging correction circuit 112, the electroluminescent display age input 118, and the summing amplifiers 116 are physically located on the electroluminescent display panel 102 within circuitry 132. Typically, aging correction circuit 112, the organic electroluminescent display age input 118, and the summing amplifiers 116 are placed around the periphery of the active area 130. The video interface circuit 24 remains on the printed circuit board 26. This embodiment places the entire aging correction functionality on the electroluminescent display panel 102 itself, making the aging correction operation and manufacturing independent of the system designer.

Additionally, the integration of the aging correction circuit 112, the electroluminescent display age input 118, and the summing amplifiers 116 on the electroluminescent display panel 102 requires fewer components to be placed on the printed circuit board 26, reducing circuit board materials and cost. Since no additional signals must be transmitted over connector 28 and cable 20, the same pinout may be used for an electroluminescent display with and without aging correction. This increases the flexibility of the electroluminescent display system 100, and allows electroluminescent displays with and without aging correction to be used in the electroluminescent display system interchangeably.

Figure 13:
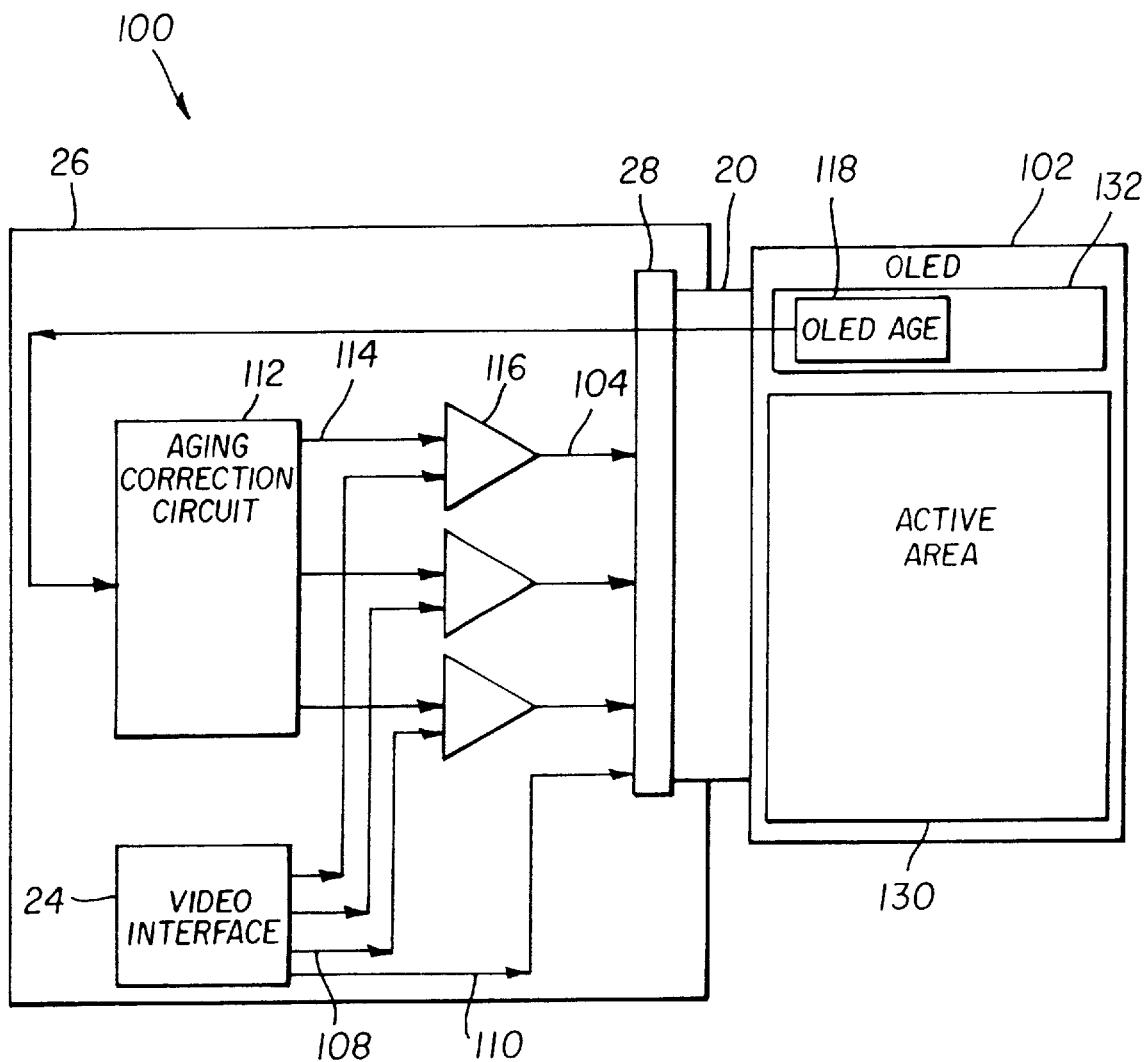
FIG. 13 is a schematic diagram showing an implementation of the present invention where an age circuit is implemented within the organic electroluminescent display.

FIG. 13 shows a further embodiment of the present invention where circuitry 132 on the electroluminescent display panel 102 includes the age circuit 118. The age of the light emitting materials of the electroluminescent display panel 102 is supplied to the age correction circuit 112 located on printed circuit board 26 via one or more conductors in cable 20. The placement of the age circuit 118 on the electroluminescent display panel 102 allows the measurement of materials age to be coupled to the electroluminescent display panel 102, and not physically a part of circuitry external to the electroluminescent display panel 102. Thus, a different electroluminescent display panel 102 can be plugged in to connector 28, and the age correction circuit 112 would operate correctly for this new display, within the need for reprogramming. This increases the usability of the electroluminescent display system 100, decreasing integration costs, and allowing complex aging correction circuitry 112 to be implemented off of the display substrate and in integrated circuitry, where manufacturing yields are currently higher.

The above embodiments described in relation to the integration onto the OLED substrate are in relation to the embodiment of FIG. 3. Similar embodiments in relation to FIGS. 4–6, can be readily implemented by a person of ordinary skill in the art, since the basic methods and reasoning are similar.

The invention has been described in detail with particular reference to certain preferred embodiments thereof, but it will be understood that variations and modifications can be effected within the spirit and scope of the invention. For example, these aging correction techniques may be used for both passive and active matrix organic electroluminescent displays, although the integration of transistor circuitry on passive matrix displays is not likely. Additionally, organic electroluminescent displays with color changing materials or color filters typically use a single color light emitting material. The embodiments described herein may be used for such devices, and therefore fall within the scope of the present invention. Although the embodiments herein were described in relation to signal transmission between a printed circuit board and an electroluminescent display via a cable, other interface means, such as optical and electromagnetic transmission of signals, fall within the scope of the present invention of an aging correction means by altering analog video signals.

PARTS LIST 10 organic light emitting diode flat panel display
12 transparent substrate
14 transistor switch matrix layer
16 thin film transistor
18 light emission layer
20 cable
24 video interface circuit
26 printed circuit board
28 connector
100 electroluminescent display system
102 electroluminescent display panel
104 aging corrected analog video signal
108 analog video signal
110 control signals
112 aging correction circuit
114 analog correction signal
116 summing amplifier
118 age circuit
120 controller
122 memory
124 latch
124 digital-to-analog converter
126 active area
130 circuitry
132 digital transmission circuit
136 digital receiver circuit

What is claimed is:

1. A display, comprising:
    a) an electroluminescent display panel containing a light emitting material;
    b) a video interface circuit for producing an analog video signal for driving the display;
    c) an age circuit for supplying a signal representing the age of the light emitting material;
    d) an aging correction circuit responsive to the age signal for forming an analog aging correction signal, the aging correction circuit including controller means responsive to the age signal for producing a digital correction value, and a digital to analog converter for converting the digital correction value to an analog correction signal; and
    e) a summing amplifier for summing the analog aging correction signal with the video signal.

2. The display claimed in claim 1, wherein the electroluminescent display is an organic light emitting diode display.

3. The display claimed in claim 1, wherein the age circuit includes a clock for measuring the amount of time the electroluminescent display has been driven.

4. The display claimed in claim 1, wherein the age circuit includes means for measuring a test pattern displayed on the electroluminescent display.

5. The display claimed in claim 1, wherein the age circuit includes means for measuring one or more electrical properties of a reference pixel located within the electroluminescent display.

6. The display claimed in claim 1, wherein the age circuit includes means for measuring the light output of a reference pixel located within the electroluminescent display.

7. The display claimed in claim 1, wherein the age circuit supplies one average age of the light emitting materials.

8. The display claimed in claim 1, wherein the age circuit supplies an average age of each light emitting material in a multicolor electroluminescent display.

9. The display claimed in claim 1, wherein the age circuit supplies an average age of the light emitting materials for subset areas of the electroluminescent display.

10. The display claimed in claim 1, wherein the age circuit supplies an average age of each light emitting material for subset areas of the electroluminescent display.

11. The display claimed in claim 1, wherein the age circuit supplies an average age of the light emitting materials for each pixel within the electroluminescent display.

12. The display claimed in claim 1, wherein the age circuit supplies the age of each light emitting material at each pixel of the electroluminescent display.

13. The display claimed in claim 1, wherein the controller means includes a controller, a memory for storing age-to-voltage correction values addressable by the controller, and a latch for holding the age-to-voltage correction values output by the memory.

14. The display claimed in claim 13, wherein the memory is volatile.

15. The display claimed in claim 13, wherein the memory is nonvolatile.

16. The display claimed in claim 15, wherein the nonvolatile memory is a read-only memory (ROM).

17. The display claimed in claim 15, wherein the nonvolatile memory is a FLASH memory device.

18. The display claimed in claim 15, wherein the nonvolatile memory is an electrically programmable read-only memory (EPROM).

19. The display claimed in claim 15, wherein the nonvolatile memory is an electrically erasable programmable read-only memory (EEPROM).

20. The display claimed in claim 13, wherein the memory and the controller are formed on a common substrate.

21. The display claimed in claim 13, wherein the latches are located within the memories.

22. The display claimed in claim 1, wherein one or more of the circuits selected from the group comprising the age circuit, the aging correction circuit and the summing amplifier is circuitry physically located on a common substrate with the electroluminescent display panel.

23. The display claimed in claim 22, wherein the circuitry located within the electroluminescent display includes the age circuit.

24. The display claimed in claim 23, wherein the age circuit supplies one average age of the light emitting materials.

25. The display claimed in claim 23, wherein the age circuit supplies an average age of each light emitting material in a multicolor electroluminescent display.

26. The display claimed in claim 23, wherein the age circuit supplies an average age of the light emitting materials for subset areas of the electroluminescent display.

27. The display claimed in claim 23, wherein the age circuit supplies an average age of each light emitting material for subset areas of the electroluminescent display.

28. The display claimed in claim 23, wherein the age circuit supplies an average age of the light emitting materials for each pixel within the electroluminescent display.

29. The display claimed in claim 23, wherein the age circuit supplies the age of each light emitting material at each pixel of the electroluminescent display.

30. The display claimed in claim 22, wherein the circuitry located within the electroluminescent display includes the summing amplifiers.

31. The display claimed in claim 1, wherein the controller means includes a controller responsive to the output of the age circuit for calculating age-to-voltage correction values, and a latch for holding the age-to-voltage correction values output by the memory.

32. The display claimed in claim 22, wherein the aging correction circuit includes a digital-to-analog converter and a digital receiver circuit for receiving digital age-to-voltage correction values, located within circuitry on a common substrate with the electroluminescent display panel.

33. The display claimed in claim 32, wherein the aging correction circuit additionally includes a latch, located within circuitry on a common substrate with the electroluminescent display panel.

34. The display claimed in claim 33, wherein the aging correction circuit located additionally includes a memory, located within circuitry on a common substrate with the electroluminescent display panel.

35. The display claimed in claim 34, wherein the aging correction circuit located additionally includes a controller, located within circuitry on a common substrate with the electroluminescent display panel.

36. The display claimed in claim, 32, wherein the digital receiver circuit is a parallel receiver.

37. The display claimed in claim 32, wherein the digital receiver circuit is a serial receiver.

38. The display claimed in claim 32, wherein the digital receiver circuit contains a demultiplexing circuit, so that a received digital age-to-voltage correction value may be routed to one of a multiplicity of video channels.

* * * * *